United States Patent
Kim et al.

(10) Patent No.: US 12,170,418 B2
(45) Date of Patent: Dec. 17, 2024

(54) CONNECTOR AND DISPLAY APPARATUS HAVING THE SAME

(71) Applicant: SAMSUNG ELECTRONICS CO., LTD., Suwon-si (KR)

(72) Inventors: Jinsub Kim, Suwon-si (KR); Woosub Bang, Suwon-si (KR); Youngjin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 212 days.

(21) Appl. No.: 17/737,335

(22) Filed: May 5, 2022

(65) Prior Publication Data

US 2023/0048494 A1 Feb. 16, 2023

Related U.S. Application Data

(63) Continuation of application No. PCT/KR2022/006280, filed on May 2, 2022.

(30) Foreign Application Priority Data

Aug. 12, 2021 (KR) .......... 10-2021-0106605

(51) Int. Cl.
  *H01R 12/89* (2011.01)
  *H01R 12/70* (2011.01)
  *H01R 12/77* (2011.01)

(52) U.S. Cl.
  CPC ......... *H01R 12/89* (2013.01); *H01R 12/7076* (2013.01); *H01R 12/771* (2013.01)

(58) Field of Classification Search
  CPC ............... H01R 12/89; H01R 12/7076; H01R 12/771

(Continued)

(56) References Cited

U.S. PATENT DOCUMENTS 7,819,691 B2 * 10/2010 Ryu .................. G02F 1/13452
  439/495
8,029,314 B2 * 10/2011 Huang .................. H01R 12/78
  439/492

(Continued)

FOREIGN PATENT DOCUMENTS

JP  2003-297464  10/2003
JP  2011-216422  10/2011

(Continued)

OTHER PUBLICATIONS

International Search Repot dated Aug. 19, 2022 in International Patent Application No. PCT/KR2022/006280 (3 pages; 4 pages English translation).
PCT/ISA/237 dated Aug. 19, 2022 in International Patent Application No. PCT/KR2022/006280 (4 pages).

(Continued)

*Primary Examiner* — Binh B Tran
(74) *Attorney, Agent, or Firm* — STAAS & HALSEY LLP

(57) ABSTRACT

A display apparatus including: a display panel; a chassis assembly supporting the display panel; a printed circuit board accommodated in the chassis assembly, and configured to drive and control the display panel; and a connector installed on the printed circuit board, and including a seating portion and a connector terminal positioned on one side of the seating portion, wherein the connector is connected to the cable by seating a surface of a body of a cable on the seating portion in a vertical direction while the surface of the body of the cable faces the seating portion and contact-coupling a cable terminal formed at one end of the body of the cable with the connector terminal.

16 Claims, 10 Drawing Sheets

(58) Field of Classification Search
USPC .......................................................... 361/749
See application file for complete search history.

(56) References Cited

U.S. PATENT DOCUMENTS

| | | | |
|---|---|---|---|
| 8,408,928 | B2 | 4/2013 | Won et al. |
| 11,271,336 | B2 | 3/2022 | Nakamura |
| 2007/0093110 | A1* | 4/2007 | Park .................. H01R 12/7076 |
| | | | 439/351 |
| 2008/0311785 | A1 | 12/2008 | Hyun et al. |
| 2011/0069430 | A1 | 3/2011 | Huang |
| 2021/0218170 | A1 | 7/2021 | Nagasaka |

FOREIGN PATENT DOCUMENTS

| | | |
|---|---|---|
| JP | 2012-182109 | 9/2012 |
| JP | 5922627 | 5/2016 |
| JP | 2021-22539 | 2/2021 |
| KR | 10-2007-0021677 | 2/2007 |
| KR | 10-2008-0044631 | 5/2008 |
| KR | 10-2008-0049908 | 6/2008 |
| KR | 10-1148199 | 5/2012 |
| KR | 10-2012-0081650 | 7/2012 |
| KR | 10-2018-0019856 | 2/2018 |
| KR | 20-2021-0000740 | 4/2021 |
| TW | 1599121 | 9/2017 |

OTHER PUBLICATIONS

Extended European Search Report dated Sep. 3, 2024 for European Application No. 22855963.9.

* cited by examiner (a)

(b)

(c)

(a)

(b)

CONNECTOR AND DISPLAY APPARATUS HAVING THE SAME

CROSS-REFERENCE TO RELATED APPLICATION

This application is a continuation application, under 35 U.S.C. § 111(a), of International Application No. PCT/KR2022/006280, filed on May 2, 2022, which is based on and claims priority under 35 U.S.C. § 119 to Korean Patent Application No. 10-2021-0106605, filed on Aug. 12, 2021 in the Korean Intellectual Property Office, the disclosure of which is incorporated by reference herein in its entirety.

BACKGROUND

1. Field

The disclosure relates to a connector and a display apparatus having the same, and more particularly, to a connector having an improved cable connection structure and a display apparatus including the connector.

2. Description of the Related Art

A display apparatus is an output apparatus that converts electrical information into visual information to display the visual information for users. Display apparatuses include, as well as a television and a monitor, a portable device, such as a notebook PC, a smart phone, a tablet PC, etc.

A display apparatus includes a self-emissive display panel such as an Organic Light-Emitting Diode (OLED), or a non-emissive display panel such as a Liquid Crystal Display (LCD).

A display apparatus to which a non-emissive display panel is applied may include a backlight unit for supplying light to the display panel. The backlight unit includes an Edge-type in which light sources are positioned to at least one side of the display panel, and a Direct-type in which light sources are positioned behind the display panel.

The display apparatus may include various printed circuit boards for operating the display apparatus. The printed circuit boards may be connected to each other to transmit and receive data, signals, or power. The printed circuit boards may be connected to each other by electrical wires, a Flexible Flat Cable (FFC), or a Flexible Printed Circuit Board (FPCB).

SUMMARY

Therefore, it is an aspect of the disclosure to provide a connector having an improved cable connection method and a display apparatus including the connector.

A display apparatus according to a concept of the disclosure includes: a display panel; a chassis assembly to support the display panel; and a printed circuit board assembly accommodated in the chassis assembly, and the printed circuit board assembly including a printed circuit board configured to drive and control the display panel; and a connector installable on the printed circuit board and configured to electrically connect the display panel to the printed circuit board via a cable, and the connector including a seating portion, and a connector terminal positioned at one side of the seating portion, wherein the connector is connected to the cable while a surface of the cable faces the seating portion along a vertical direction of the connector and contact-coupling a cable terminal formed at one end of the cable with the connector terminal.

The connector may include: a case including a recess forming the seating portion, wherein an upper side of the recess opens so that the cable is seated on the seating portion along the vertical direction of the connector; a cover rotatably couplable with the case to open or close the seating portion; an elastic member providing a preset elastic force to the cover to rotate the cover along a direction of closing the seating portion; a locking device, provided in at least one of the cover or the case, coupling the cover with the case in a state in which the cover opens the seating portion; and an unlocking device releasing the coupling of the cover with the case by the locking device.

The unlocking device may include: a switch; and an interworking portion formed to extend from the switch, and the interworking portion pressing the cover by moving upward upon a downward-pressing of the switch.

The locking device may include: a first hole provided in the case; and a first elastic protrusion provided in the cover and couplable with the first hole.

The unlocking device may push the first elastic protrusion out of the first hole in a state in which the first elastic protrusion is coupled with the first hole.

The locking device may be a first locking device, the connector may further comprises a second locking device, provided in at least one of the cover or the case, to couple the cover with the case in a state in which the cover closes the seating portion, and the second locking device may include: a second hole provided in the case; and a second elastic protrusion provided in the cover and coupled with the second hole.

The cover may include a separating prevention portion formed to protrude toward the seating portion and couplable with the cable, to prevent the cable from departing from the seating portion, in a state in which the cable is seated on the seating portion and the cover closes the seating portion, and the cable may include a cutting groove corresponding to the separating prevention portion.

The one side of the seating portion, on which the connector terminal is positioned, may be a first side, the case may further include a projection formed to protrude inward along a width direction of the connector such that a second side of the seating portion, which is opposite to the first side of the seating portion, has a smaller width than the first side, and a catching portion of the cable is adapted to be caught by the projection to prevent the cable seated on the seating portion from departing from the seating portion along a horizontal direction of the connector.

The unlocking device may further include an auxiliary guide member guiding a movement of the interworking portion so that the interworking portion is movable along an up-down direction by interworking with the switch.

The elastic member may include at least one torsion spring.

The cable may include at least one of a Flexible Flat Cable (FFC) or a Flexible Printed Circuit Board (FPCB).

The connector may further include a handle that is gripped.

The switch may be positioned inside the seating portion and configured to be pressed downward upon seating of the cable on the seating portion along the vertical direction of the connector.

The switch may be positioned outside the seating portion without interfering with the cable.

One end of the cable may be electrically connected to the printed circuit board, and another end of the cable may be electrically connected to the display panel.

A connector according to a concept of the disclosure includes: a case accommodating a cable; a cover rotatably coupled with the case, closing the case by rotating in a first direction, and opening the case by rotating in a second direction; an elastic member providing a preset elastic force to the cover to rotate the cover in the first direction, a locking device provided in at least one of the cover or the case to couple the cover with the case in a state in which the case opens; and a unlocking device releasing the coupling of the cover with the case by the locking device, wherein the unlocking device includes a switch, and an interworking portion extending from the switch and guiding a movement of the unlocking device according to a movement of the switch by interworking with the switch.

The locking device may include a first hole provided in the case, and a first elastic protrusion provided in the cover to be coupled with the first hole, and the interworking portion of the unlocking device may protrude toward the first hole and push the first elastic protrusion out of the first hole to release coupling of the first elastic protrusion with the first hole.

The case may include a second hole, and the cover may include a second elastic protrusion coupled with the second hole of the case in a state in which the case is closed.

The cover may include a separating prevention portion coupled with the cable to prevent the cable from departing from the case, and the cable may include a cutting groove corresponding to the separating prevention portion.

The cable may include at least one of a Flexible Flat Cable (FFC) or a Flexible Printed Circuit Board (FPCB).

BRIEF DESCRIPTION OF THE DRAWINGS

The above and other aspects, features and advantages of certain embodiments of present disclosure will become apparent from the following description taken in conjunction with the accompanying drawings of which.

DETAILED DESCRIPTION

Figure 1:
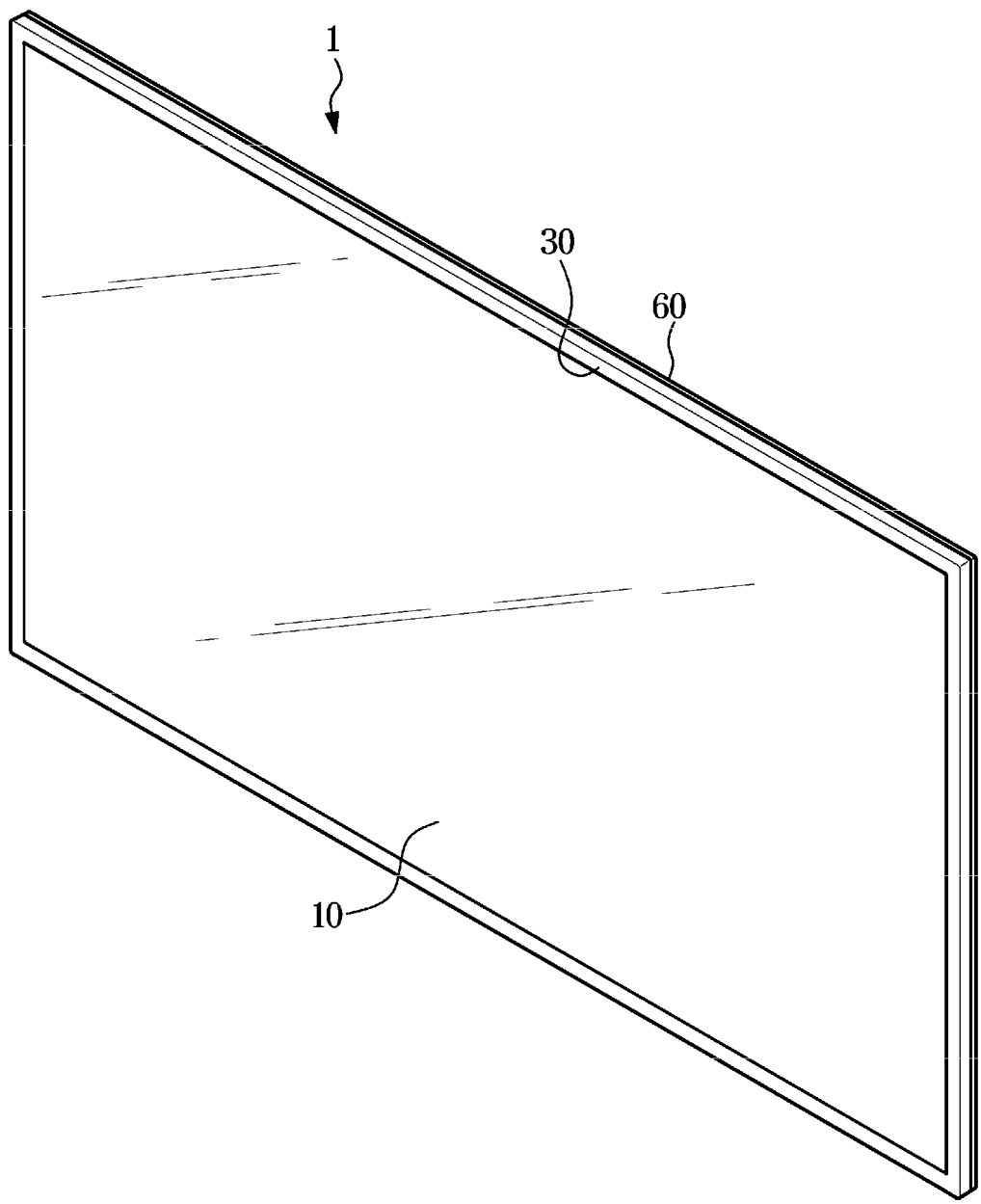
FIG. 1 shows a display apparatus according to an embodiment of the disclosure.

Configurations illustrated in the embodiments and the drawings described in the present specification are only the preferred embodiments of the disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe embodiments, and are not intended to restrict and/or limit the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

It will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the disclosure. As used herein, the term "and/or" includes any and all combinations of one or more of associated listed items.

In the entire specification, it will also be understood that when an element is referred to as being "on" or "over" another element, it can be directly on the other element or intervening elements may also be present.

Figure 7:
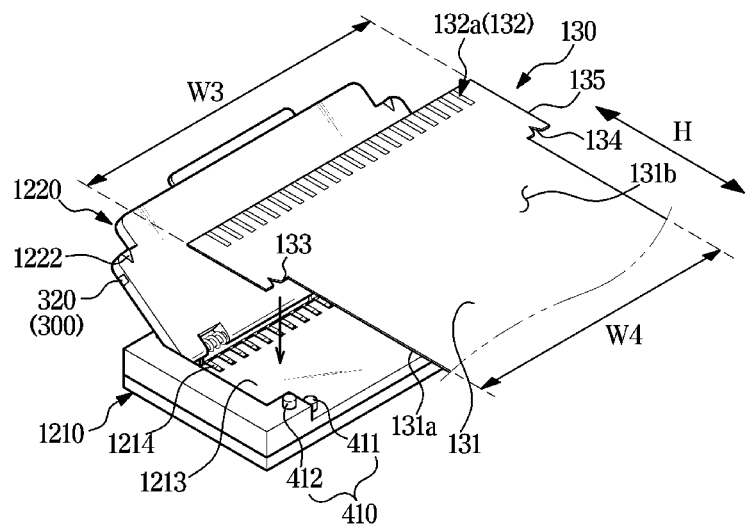
FIG. 7 shows a process of seating a cable on the connector shown in FIG. 4.
Figure 7:
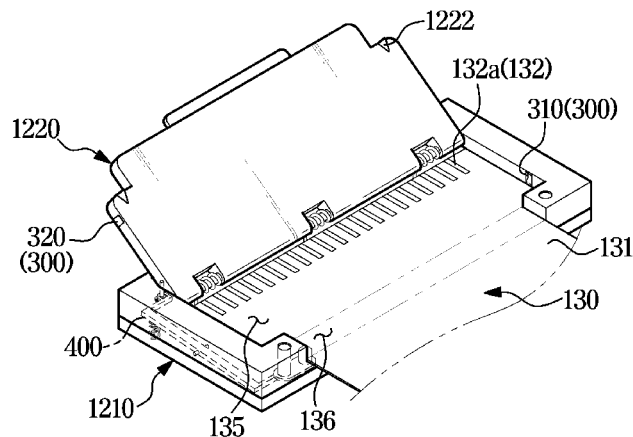
Figure 7:
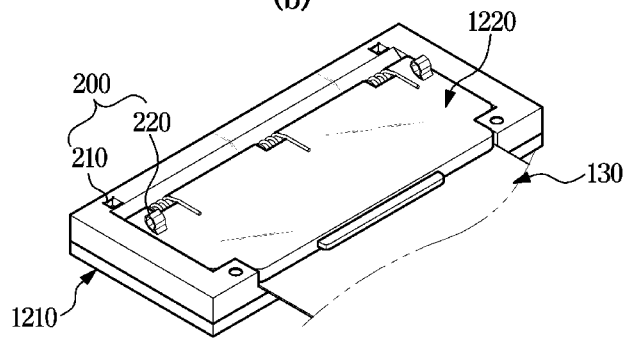

In the following description, the terms "front-rear direction", "front surface", "rear surface", "vertical direction", "horizontal direction", etc. are defined based on the drawings, and the shapes and positions of the corresponding components are not limited by the terms. For example, referring to FIG. 2, a direction in which components (for example, a display panel 10, a chassis assembly, etc.) of a display apparatus 1 are arranged may be defined as a front-rear direction X. Also, a height direction of the connector 120 in FIGS. 4 and 5 may be defined as a vertical direction V, and a width direction of the connector 120 may be defined as a width direction W. Referring to FIG. 7, a direction in which a cable body 131 of a cable 130 extends may be defined as a horizontal direction H. However, the definitions are merely for illustrative purposes and not for limitation purposes.

It is another aspect of the disclosure to provide a connector capable of securing a stable electrical connection between a printed circuit board and a cable, and a display apparatus including the connector.

It is still another aspect of the disclosure to provide a connector capable of performing an automatic closing function, and a display apparatus including the connector.

Additional aspects of the disclosure will be set forth in part in the description which follows and, in part, will be obvious from the description, or may be learned by practice of the disclosure.

Hereinafter, the embodiments of the disclosure will be described in detail with reference to the accompanying drawings.

Figure 2:
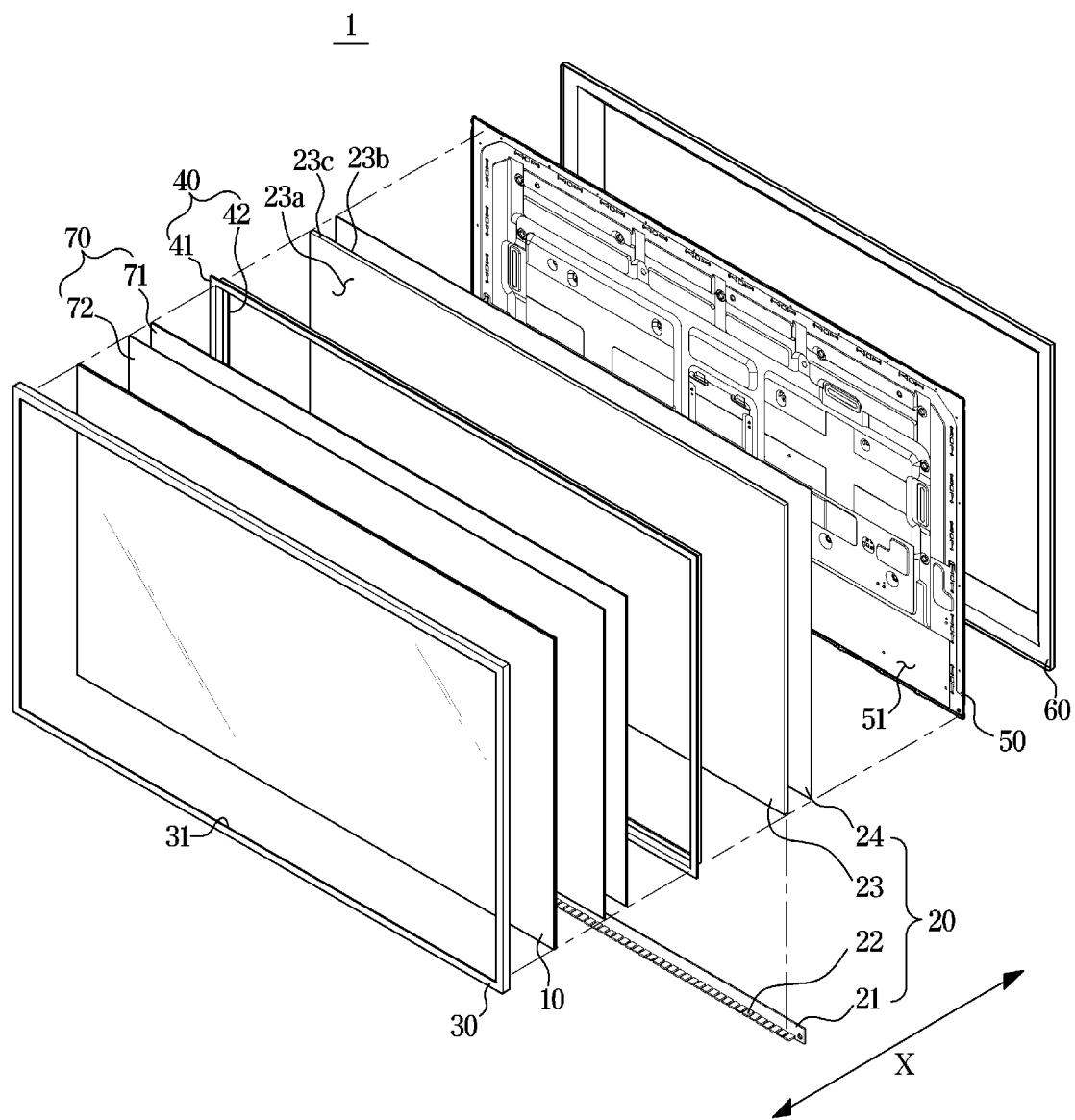
FIG. 2 is an exploded view of the display apparatus shown in FIG. 1.

FIG. 1 shows a display apparatus according to an embodiment of the disclosure. FIG. 2 is an exploded view of the display apparatus shown in FIG. 1.

The display apparatus 1 may be an apparatus capable of processing an image signal received from outside and visually displaying a processed image. Hereinafter, a case in which the display apparatus 1 is a television (TV) is provided as an example, although not limited thereto. For example, the display apparatus 1 may be implemented in various forms, such as a monitor, a portable multimedia apparatus, a portable communication apparatus, a portable computing apparatus, etc., and the display apparatus 1 may be implemented in any form capable of visually displaying images.

The display apparatus 1 may be a flat display apparatus having a flat screen, or a curved display apparatus having a curved screen. Also, the display apparatus 1 may be a bendable display apparatus capable of changing the screen between a flat state and a curved state or adjusting the curvature of the curved screen.

Referring to FIGS. 1 and 2, the display apparatus 1 may include a display panel 10 for displaying images(video).

The display panel 10 may include a Liquid Crystal Display (LCD) panel. The LCD panel may display images by using liquid crystal that appears the optical characteristics according to a change in voltage and temperature. The LCD panel may be configured with a Thin Film Transistor (TFT) substrate, a color filter substrate coupled with the TFT substrate in such a way as to face the TFT substrate, and liquid crystal injected between the TFT substrate and the color filter substrate. The TFT substrate may be a transparent substrate on which TFTs as switching devices are arranged in a matrix form, and the color filter substrate may be a transparent substrate on which RGB color pixels as color pixels expressing preset colors are formed by a thin film process, although not limited thereto. The display panel 10 may include a Light Emitting Diode (LED) panel or an Organic Light Emitting Diode (OLED) panel.

The display apparatus 1 may include a backlight unit 20 for supplying light to the display panel 10. The backlight unit 20 may irradiate light toward the display panel 10.

In the drawings, the display apparatus 1 is shown to be a non-emissive display apparatus including the backlight unit 20. However, this is an example, and the display apparatus 1 may be an emissive display apparatus. In a case in which the display apparatus 1 is an emissive display apparatus, the backlight unit 20 may be omitted.

The backlight unit 20 may be an edge type in which a light source 22 is positioned to one side of the display panel 10. The light source 22 may be positioned to at least one side among four sides of the display panel 10. Although not shown in the drawings, the display apparatus 1 may include a direct-type backlight unit in which a light source is positioned directly behind a display panel.

The backlight unit 20 may include the light source 22, a substrate 21 on which the light source 22 is mounted, and various optical members positioned on a traveling path of light emitted from the light source 22.

The light source 22 may include a LED. The LED may be provided in a form of a package in which a LED chip is mounted on a substrate and a resin is filled. Meanwhile, a Cold Cathode Fluorescent Lamp (CCFL) or an External Electrode Fluorescent Lamp (EEFL) may be used as the light source 22.

A plurality of light sources 22 may be aligned on the substrate 21. A circuit pattern, etc. for transferring driving power and signals to the light source 22 may be printed on the substrate 21. In FIG. 2, a single substrate 21 is shown, however, a plurality of substrates 21 may be provided.

The optical members may be positioned on the traveling path of light emitted from the light source 22. The optical members may guide a traveling direction of light or improve optical characteristics.

The optical members may include a light guide plate 23 for uniformly distributing light emitted from the light source 22 toward the display panel 10, and a reflector sheet 24 for reflecting light to prevent light loss.

The light guide plate 23 may be made of a Poly Methyl Methacrylate Acrylate (PMMA) material. On the light guide plate 23, a pattern for changing a path of light may be provided. In an edge type backlight unit, the light source 22 may be positioned to one side of the light guide plate 23. For example, the light source 22 may be positioned to correspond to at least one side 23c among the four sides of the light guide plate 23. Light entered one side of the light guide plate 23 may be scattered by the pattern formed on a rear surface 23b of the light guide plate 23 and then exit through a front surface 23a of the light guide plate 23. Side surfaces of the light guide plate 23 may be spaced a preset distance from the light source 22 by considering thermal expansion.

The reflector sheet 24 may reflect light emitted from the light source 22 to prevent light loss from the rear surface 23b of the light guide plate 23. The reflector sheet 24 may be formed in various forms, such as a sheet, a film, a plate, etc. For example, the reflector sheet 24 may be formed by coating a base material with a high-reflective coating material. The base material may be SUS, BRASS, aluminum, PET, etc. and the high-reflective coating material may be silver, $TiO_2$, etc.

The optical members may further include a quantum dot unit (not shown) or a quantum dot sheet. The quantum dot unit or the quantum dot sheet may improve color reproducibility by changing a wavelength of light. The color reproducibility is an index of similarity to natural colors, and relates to an area expressed on color coordinates. The quantum dot unit or the quantum dot sheet may be positioned on a path of light between the light source 22 and the display panel 10.

The display apparatus 1 may include various kinds of optical sheets 70 for improving optical characteristics. The optical sheets 70 may be positioned in front of the light guide plate 23 to improve the optical characteristics of light exiting the light guide plate 23. The optical sheets 70 may be positioned between the light guide plate 23 and the display panel 10.

The optical sheet 70 may include a diffuser sheet 71 and a prism sheet 72.

Because light guided through the light guide plate 23 directly enters eyes, the pattern of the light guide plate 23 may be presented as it is to the eyes. Therefore, the diffuser sheet 71 may cancel or reduce the pattern of the light guide plate 23.

The prism sheet 72 may concentrate light whose brightness has deteriorated by passing the diffuser sheet 71 to improve light brightness. The prism sheet 72 may be a Dual Brightness Enhancement Film (DBEF) sheet which is a high brightness prism sheet.

The optical sheets 70 may further include a protection sheet (not shown) for protecting the optical sheets 70 against external impacts or foreign materials.

The display apparatus 1 may include a chassis assembly for accommodating the display panel 10 and/or the backlight unit 20. The chassis assembly may support the display panel 10 and/or the backlight unit 20.

As shown in FIG. 2, the chassis assembly may include a front chassis 30, a middle mold 40, and a rear chassis 50.

The front chassis 30 may include an opening 31 for exposing the display panel 10.

The middle mold 40 may include a middle mold side portion 41, and a middle support 42 protruding inward from the middle mold side portion 41 to support the display panel 10 and the optical members and maintain an interval between the display panel 10 and the optical members.

The bottom chassis 50 may support the backlight unit 20. Various components of the display apparatus 1, such as the front chassis 20 and the middle mold 40, may be fixed to and supported on the rear chassis 50.

On a front surface 51 of the rear chassis 50, the substrate 21 of the backlight unit 20 may be mounted. For example, the rear chassis 50 may function to dissipate heat generated from the light source 22 to the outside. Heat generated from the light source 22 may be transferred to the rear chassis 50 via the substrate 21 and dissipated from the rear chassis 50.

The rear chassis 50 may be formed of various metal materials having excellent thermal conductivity, such as aluminum or stainless steel, or a plastic material such as an ABS resin. The substrate 21 may also be a metal PCB formed of an aluminum material having excellent thermal conductivity.

At least one of the front chassis 30, the middle mold 40 or the rear chassis 50 may be omitted or integrated into one body.

The display apparatus 1 may further include a rear cover 60 surrounding the chassis assembly to protect and accommodate the chassis assembly.

Meanwhile, although not shown in the drawings, the display apparatus 1 may further include a leg (not shown) for supporting the display apparatus 1 on an installation surface.

Figure 3:
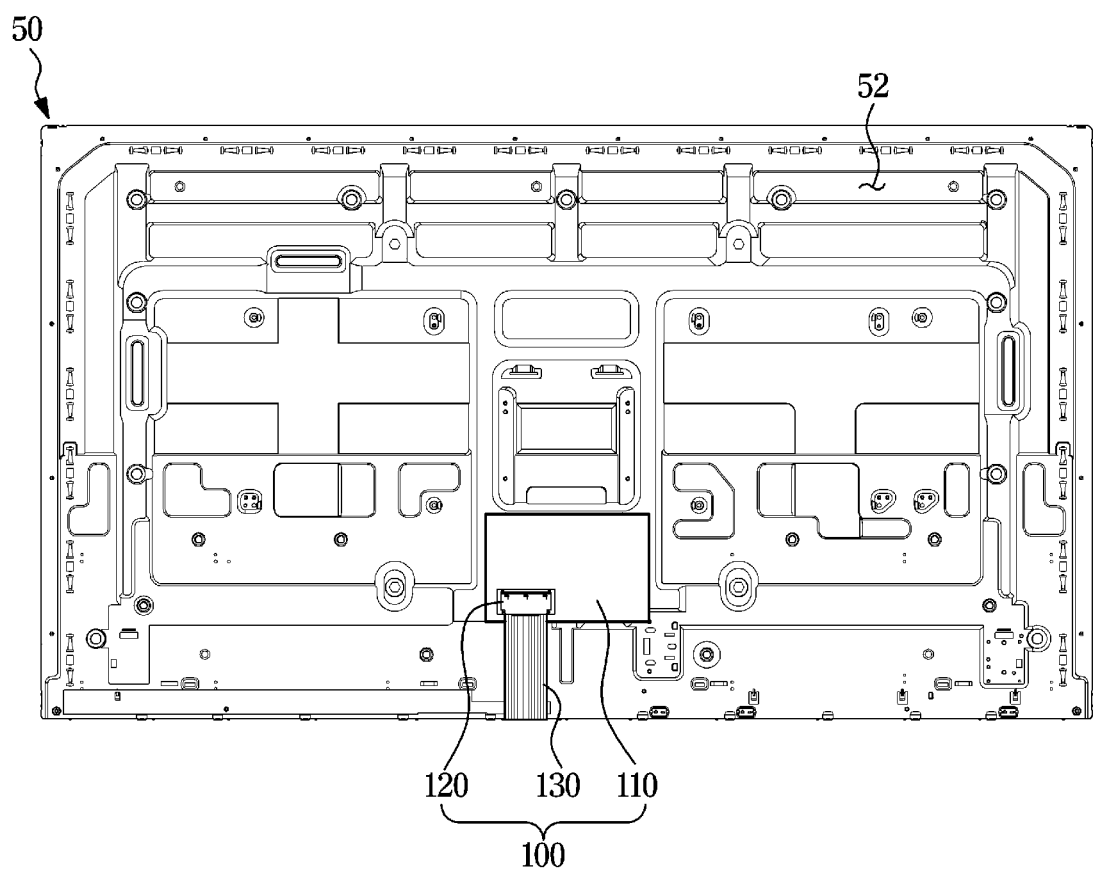
FIG. 3 shows a rear surface of a rear chassis shown in FIG. 2.
Figure 4:
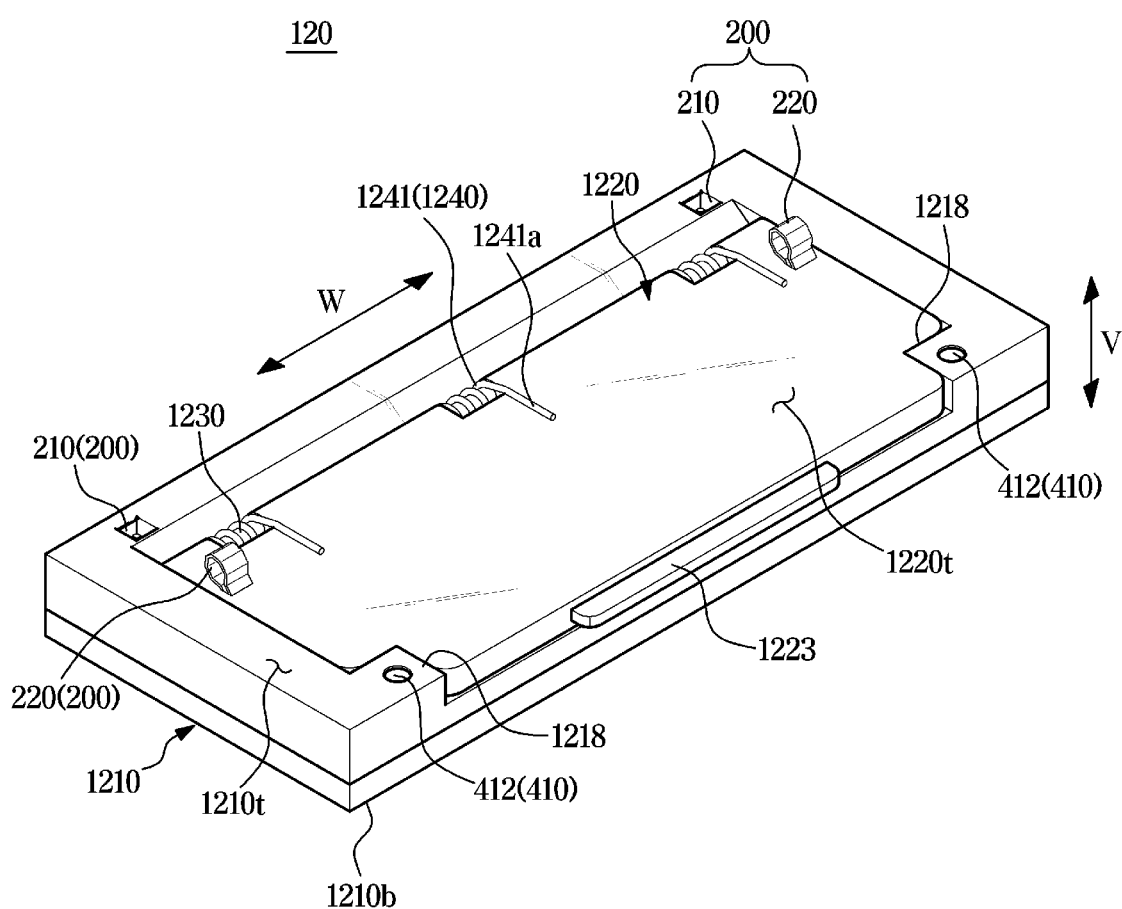
FIG. 4 schematically shows a closed state of a connector shown in FIG. 3.
Figure 5:
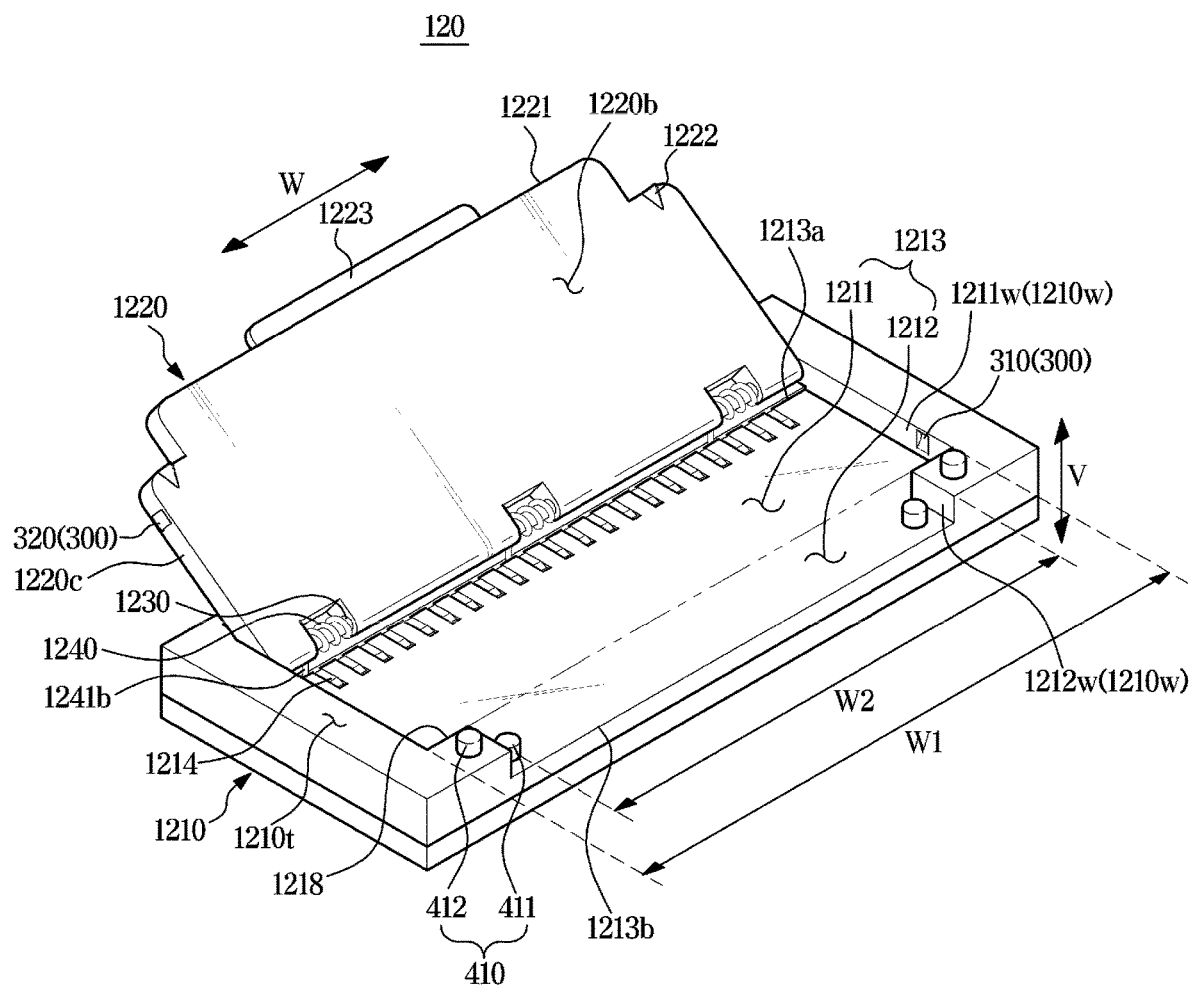
FIG. 5 schematically shows an open state of the connector shown in FIG. 4.
Figure 6:
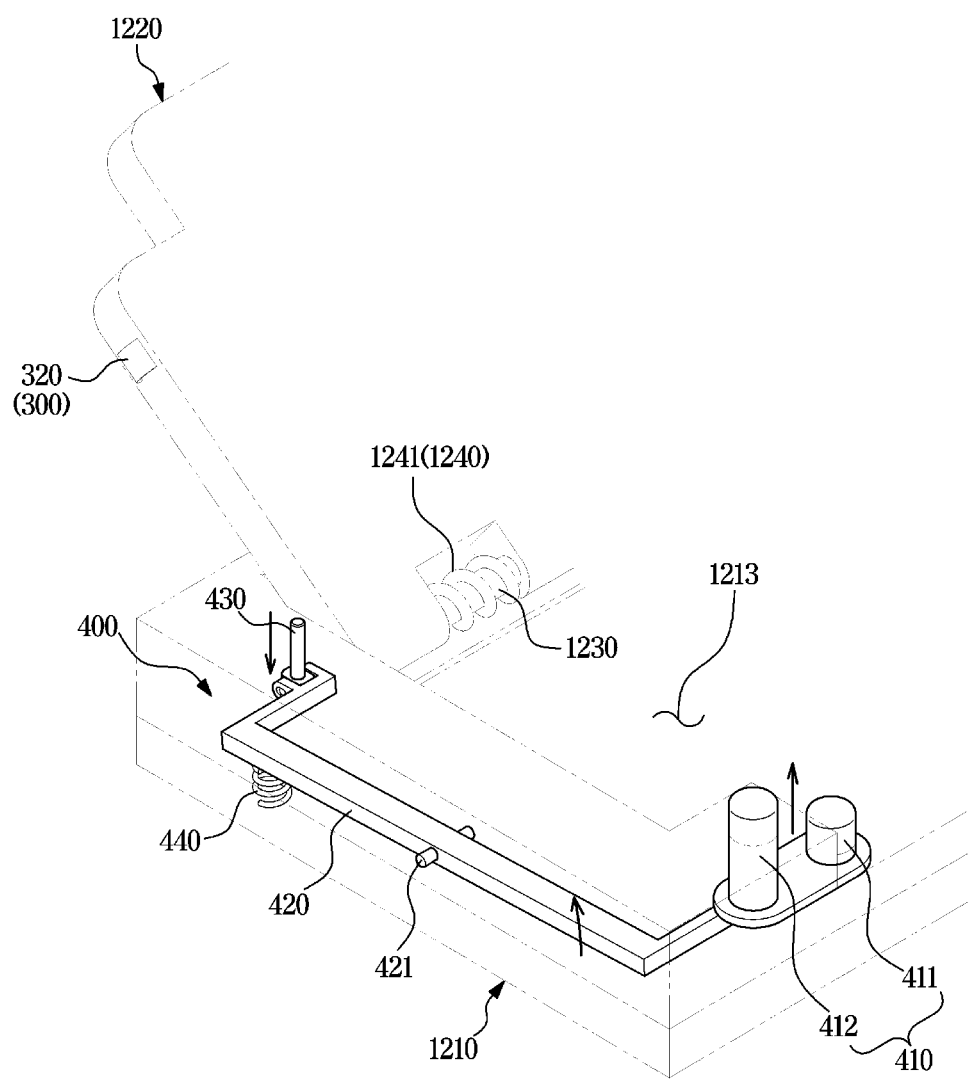
FIG. 6 schematically shows a unlocking device of the connector shown in FIG. 5.

FIG. 3 shows a rear surface of a rear chassis shown in FIG. 2. FIG. 4 schematically shows a closed state of a connector shown in FIG. 3. FIG. 5 schematically shows an open state of the connector shown in FIG. 4. FIG. 6 schematically shows a unlocking device of the connector shown in FIG. 5.

Referring to FIG. 3, the display apparatus 1 may include at least one printed circuit board assembly 100. The printed circuit board assembly 100 may be accommodated in the chassis assembly. More specifically, the printed circuit board assembly 100 may be positioned on a rear surface 52 of the rear chassis 50. For example, the printed circuit board assembly 100 may include an Integrated Circuit (IC) (not shown) for transmitting and receiving data, signals, or power wirelessly. Meanwhile, in FIG. 3, a single printed circuit board assembly 100 is shown, however, a plurality of printed circuit board assemblies 100 may be provided.

The printed circuit board assembly 100 may include a printed circuit board (PCB) 110, a connector 120, and a cable 130.

The printed circuit board 110 may drive and control at least one of the display panel 10 or the backlight unit 20. The printed circuit board 110 may supply power for driving the display apparatus 1 or control operations of the display apparatus 1. For example, the printed circuit board 110 may include at least one of a main board, a Switched Mode Power Supply (SMPS), or a source board. Various electronic components may be mounted on the printed circuit board 110 according to a purpose.

The printed circuit board 110 may be formed by using, as a base, a thin film made of an insulation such as an epoxy resin or a bakelite resin, forming a copper foil wiring on the base, and then printing a lead resist. Meanwhile, the printed circuit board 110 may include a plurality of circuit patterns, although not shown in the drawings. The printed circuit board 110 may be provided as a single-layer or a multi-layer.

The connector 120 may electrically connect the printed circuit board 110 to the cable 130. The connector 120 may be mounted on the printed circuit board 110.

Referring to FIGS. 4 and 5, the connector 120 may include a case 1210 and a cover 1220. The case 1210 and the cover 1220 may form an outer appearance of the connector 120.

The case 1210 may be substantially in a shape of a box. The case 1210 may include a shape of which an upper side 1210t partially opens. A lower side 1210b of the case 1210 may be mounted on the printed circuit board 110.

The case 1210 may accommodate the cable 130. The case 1210 may include a seating portion 1213 on which the cable 130 is seated in the vertical direction V. The seating portion 1213 may have a shape recessed from the upper side 1210t. That is, the case 1210 may include a recess forming the seating portion 1213, and an upper side of the recess may open such that the cable 130 is seated on the seating portion 1213. The seating portion 1213 may have a shape corresponding to a shape of the cable 130.

One side of the seating portion 1213, which is close to a hinge shaft 1230, may be defined as a first side 1213a, and the other side of the seating portion 1213, which is the opposite side of the first side 1213a and is distant from the hinge shaft 1230, may be defined as a second side 1213b. In this case, a width W2 of the second side 1213b may be smaller than a width W1 of the first side 1213a. Hereinafter, for convenience of description, the width W1 will be referred to as a first width W1, and the width W2 will be referred to a second width W2. More specifically, the case 1210 may further include a projection 1218 protruding inward along a width direction H of the connector 120 from the second side 1213b. As shown in FIGS. 4 and 5, a pair of projections 1218 may be provided. Thereby, the seating portion 1213 may have substantially a T shape. The cable 130 may be caught by the projection 1218.

The seating portion 1213 may include a first area 1211 and a second area 1212. The first area 1211 may extend by a preset distance from the first side 1213a of the seating portion 1213 toward the second side 1213b, and may be an area having the first width W1. The second area 1212 may extend by a preset distance from the second side 1213b of the seating portion 1213 toward the first side 1213a, and may be an area having the second width W2.

The case 1210 may include an inner wall 1210w connecting the recess forming the seating portion 1213 to the upper side 1210t. For example, the inner wall 1210w may include a first inner wall 1211w connecting a recess forming the first area 1211 to the upper side 1210t, and a second inner wall 1212w connecting a recess forming the second area 1212 to the upper side 1210t.

The case 1210 may include a connector terminal 1214 positioned in one side of the seating portion 1213. For example, the connector terminal 1214 may be positioned at the first side 1213a of the seating portion 1213, being close to the hinge shaft 1230. The connector terminal 1214 may be electrically connected to a cable terminal 132 of the cable 130 which will be described below. The connector terminal 1214 may be in contact with the cable terminal 132. The connector terminal 1214 may be made of a conductive material to transmit electrical signals or current.

The cover 1220 may open or close the case 1210. The cover 1220 may open or close the seating portion 1213 of the case 1210. The cover 1220 may be rotatably coupled with the case 1210. The cover 1220 may rotate on the hinge shaft 1230 which will be described below. More specifically, the cover 1220 may close the seating portion 1213 by rotating in a first direction C, and open the seating portion 1213 by rotating in a second direction O (see FIG. 8). That is, the cover 1220 may open or close the seating portion 1213 by rotating in the first direction C or the second direction O.

A state in which the cover 1220 closes the seating portion 1213 of the case 1210, as shown in FIG. 4, may be referred to as a closed state of the connector 120. A state in which the cover 1220 opens the seating portion 1213 of the case 1210, as shown in FIG. 5, may be referred to as an open state of the connector 120.

The cover 1220 may include a cover body 1221. The cover body 1221 may be substantially in a shape of a plate. The cover body 1221 may include the upper side 1220$t$, a lower side 1220$b$, and a side surface 1220$c$ connecting the upper side 1220$t$ to the lower side 1220$b$. The lower side 1220$b$ may face the seating portion 1213, and the upper side 1220$t$ may be the opposite side of the lower side 1220$b$.

The cover 1220 may include a handle 1223 that may be gripped. A user may open the cover 1220 while gripping the handle 1223. The handle 1223 may extend from the cover body 1221.

The connector 120 may include the hinge shaft 1230 positioned between the case 1210 and the cover 1220. The hinge shaft 1230 may connect the cover 1220 to the case 1210. The cover 1220 may open or close the case 1210 by rotating on the hinge shaft 1230. More specifically, the cover 1220 may open or close the seating portion 1213 of the case 1210 by rotating on the hinge shaft 1230. The hinge shaft 1230 may be substantially in a shape of a bar.

The connector 120 may include an elastic member 1240 for providing the cover 1220 with a preset elastic force to enable the cover 1220 to rotate in a direction of closing the case 1210. That is, the cover 1220 may rotate in the first direction C by receiving the preset elastic force from the elastic member 1240.

For example, the elastic member 1240 may include at least one torsion spring 1241. The torsion spring 1241 may surround the hinge shaft 1230. One end 1241$a$ of the torsion spring 1241 may be coupled with the cover 1220, and the other end 1241$b$ of the torsion spring 1241 may be coupled with the case 1210.

The connector 120 may include a locking device for coupling the cover 1220 with the case 1210. More specifically, the locking device may fix the cover 120 to the case 1210. The locking device may be provided in at least one of the cover 1220 or the case 1210.

The locking device may include a first locking device 200 for coupling the cover 1220 with the case 1210 in a state in which the cover 1220 opens the seating portion 1213. That is, the first locking device 200 may provide a coupling force between the cover 1220 and the case 1210 to maintain an open state of the connector 120.

Figure 8:
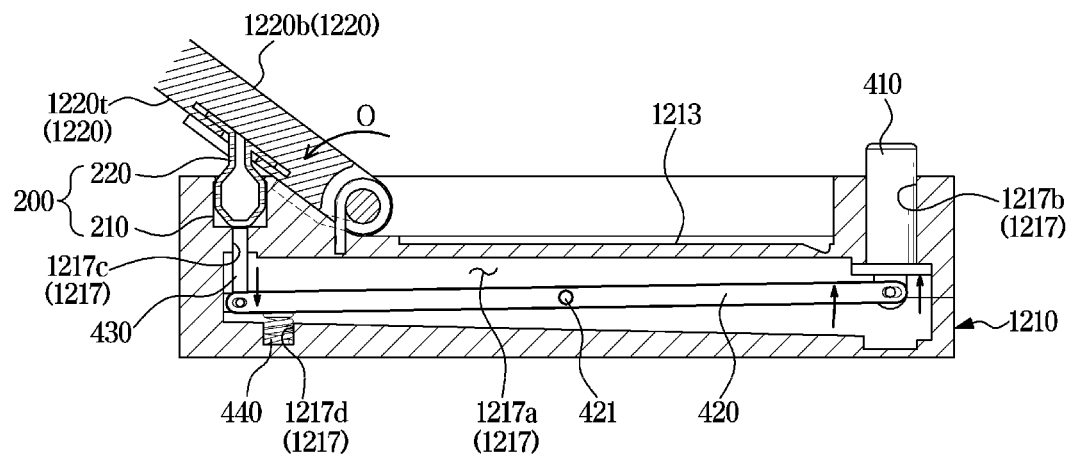
FIG. 8 shows a closing process of the connector shown in FIG. 4.
Figure 8:
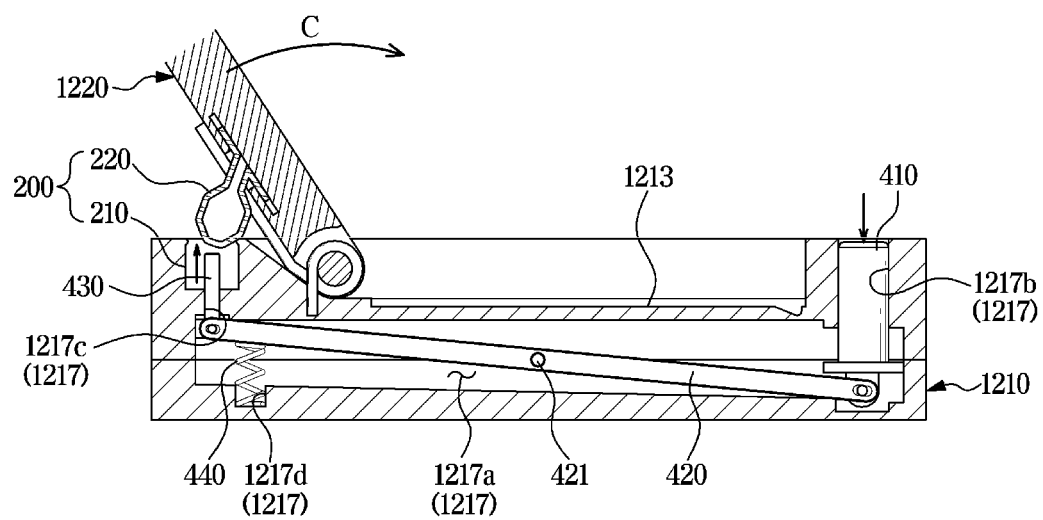

Referring to FIG. 4 and (a) of FIG. 8, the first locking device 200 may include a first hole 210 provided in the case 1210, and a first elastic protrusion 220 provided in the cover 1220 to be coupled with the first hole 210. In a state in which the cover 1220 opens the seating portion 1213, the first elastic protrusion 220 may be positioned to correspond to the first hole 210. More specifically, the first hole 210 may be formed in the upper side 1210$t$ of the case 1210, being adjacent to the hinge shaft 1230, and the first elastic protrusion 220 may be formed in the upper side 1220$t$ of the cover 1220, being adjacent to the hinge shaft 1230. Upon rotating of the cover 1220 in the second direction O to open the seating portion 1213, the first elastic protrusion 220 may be inserted into the first hole 210, although not limited thereto. However, the first elastic protrusion 220 may be provided in the case 1210, and the first hole 210 may be provided in the cover 1220.

The locking device may include a second locking device 300 for coupling the cover 1220 with the case 1210 in a state in which the cover 1220 closes the seating portion 1213. That is, the second locking device 300 may provide a coupling force between the cover 1220 and the case 1210 to maintain a closed state of the connector 120. According to the disclosure, the second locking device 300 may prevent coupling between the cover 1220 and the case 1210 from being easily released although an external impact, etc. is applied in the closed state of the connector 120. Thereby, the connector terminal 1214 may be more stably connected to the cable terminal 132, and a bad contact between terminals may be prevented.

Figure 9:
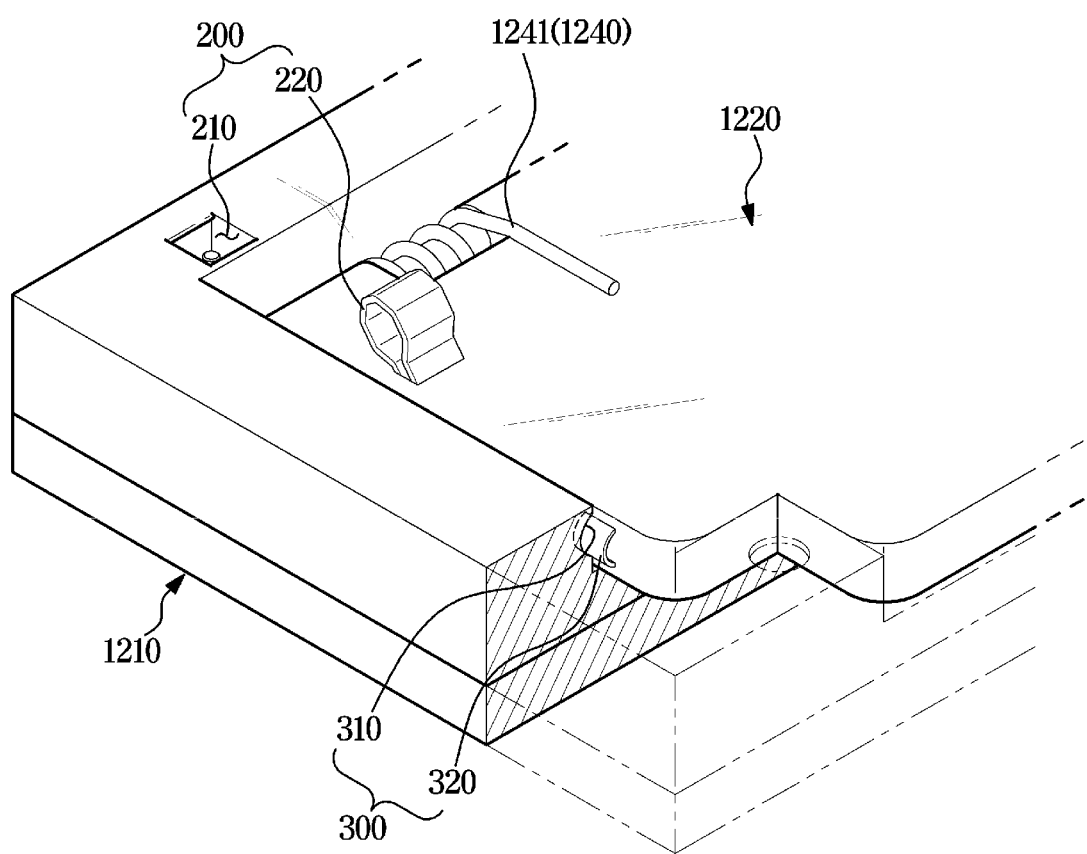
FIG. 9 shows a closed state of the connector shown in FIG. 4 by partially cutting the connector.

Referring to FIG. 9, the second locking device 300 may include a second hole 310 provided in the case 1210, and a second elastic protrusion 320 provided in the cover 1220 to be coupled with the second hole 310. In a state in which the cover 1220 closes the seating portion 1213, the second elastic protrusion 320 may be positioned to correspond to the second hole 310. More specifically, the second hole 310 may be formed in the inner wall 1210$w$ of the case 1210, and the second elastic protrusion 320 may be formed in the side surface 1220$c$ of the cover 1220. In the drawings, the second hole 310 is shown to be formed in the first inner wall 1211$w$ of the case 1210, although not limited thereto. However, the second hole 310 may be formed in the second inner wall 1212$w$. Upon rotating of the cover 1220 in the first direction C to close the seating portion 1213, the second elastic protrusion 320 may be inserted into the second hole 310, although not limited thereto. However, the second elastic protrusion 320 may be provided in the case 1210, and the second hole 310 may be provided in the cover 1220.

Referring to FIG. 6, the connector 120 may further include a unlocking device 400 for enabling the cover 1220 to close the seating portion 1213 in a state in which the seating portion 1213 of the case 1210 opens. More specifically, the unlocking device 400 may release coupling between the cover 1220 and the case 1210 by the first locking device 200. That is, the unlocking device 400 may release coupling between the cover 1220 and the case 1210, and accordingly, the cover 1220 may close the seating portion 1213 of the case 1210 by rotating in the first direction C by an elastic force received from the elastic member 1240. The connector 120 may perform an automatic closing function by including the unlocking device 400. Accordingly, a task of closing the cover 1220 manually may be omitted, which results in improvements of ease of use and productivity.

The unlocking device 400 may include a switch 410, and an interworking portion 430 interworking with the switch 410. The unlocking device 400 may further include a connecting portion 420 connecting the switch 410 to the interworking portion 430.

The switch 410 may be movable in the vertical direction V. The switch 410 may be movable in an up-down direction. The switch 410 may be pressed downward. A plurality of switches 410 may be provided. For example, the switch 410 may include at least one of a first switch 411 that is pressed upon seating of the cable 130 on the seating portion 1213, or a second switch 412 that does not interfere with the cable 130. The first switch 411 may be positioned inside the seating portion 1213, and the second switch 412 may be positioned outside the seating portion 1213. The second switch 412 may be pressed directly by a user.

The connecting portion 420 may extend toward the interworking portion 430 from the switch 410. The connecting portion 420 may extend in one direction. The connecting portion 420 may extend in the horizontal direction H. The connecting portion 420 may extend toward the first locking device 200. One end of the connecting portion 420 may be connected to the switch 410, and the other end of the connecting portion 420 may be connected to the interworking portion 430. The connecting portion 420 may be made of an elastic material.

The interworking portion 430 may be connected to the connecting portion 420 to interwork with the switch 410. The interworking portion 430 may be movable in the vertical direction V. More specifically, upon downward-pressing of the switch 410, the interworking portion 430 may move upward. In contrast, upon downward-pressing of the interworking portion 430, the switch 410 may move upward. The switch 410 and the interworking portion 430 respectively provided at both ends of the connecting portion 420 may rise up and fall down with respect to a center portion 421 of the connecting portion 420.

The unlocking device 400 may further include an auxiliary guide member 440. The auxiliary guide member 440 may guide movements of the switch 410 and the interworking portion 430. More specifically, the auxiliary guide member 440 may guide a movement of the interworking portion 430 to enable the interworking portion 430 to easily move in the up-down direction V by interworking with the switch 410. The auxiliary guide member 440 may be positioned adjacent to the interworking portion 430. The auxiliary guide member 440 may be positioned below the connecting portion 420 in such a way as to be close to the interworking portion 430. For example, the auxiliary guide member 440 may guide a movement in up-down direction V of the interworking portion 430 by providing a preset force to the interworking portion 430. Accordingly, as shown in (a) of FIG. 8, upon downward-pressing of the interworking portion 430, the auxiliary guide member 440 may be compressed, and the switch 410 may move upward with respect to the center portion 421 of the connecting portion 420. In contrast, as shown in (b) of FIG. 8, upon downward-pressing of the switch 420, the auxiliary guide member 440 may be expanded, and the interworking portion 430 may easily move upward with respect to the center portion 421 of the connecting portion 420.

The auxiliary guide member 440 may be made of an elastic material. For example, the auxiliary guide member 440 may be configured as an elastic spring to provide a preset elastic force to the interworking portion 430.

Meanwhile, the unlocking device 400 may be provided in an accommodating space inside the case 1210 of the connector 120. Other configurations of the unlocking device 400 except for the switch 410 may be not exposed to the outside of the case 1210, although not limited thereto. However, the unlocking device 400 may be provided outside the case 1210 of the connector 120.

The accommodating space 1217 may include a first accommodating area 1217a in which the entire of the unlocking device 400 may be accommodated, a second accommodating area 1217b in which the switch 410 is movable in the up-down direction, a third accommodating area 1217c in which the interworking portion 430 is movable in the up-down direction, and a fourth accommodating area 1217d in which at least one portion of the auxiliary guide member 440 may be accommodated. The third accommodating area 1217c may communicate with the first hole 210.

The cable 130 may electrically connect the display panel 10 to the printed circuit board 110, or electrically connect the backlight unit 20 to the printed circuit board 110. One end of the cable 130 may be electrically connected to the connector 120 installed on the printed circuit board 110, and the other end of the cable 120 may be electrically connected to the display panel 10 or the backlight unit 20. The cable 130 may transmit various signals between the display panel 10 or the backlight unit and the printed circuit board 110.

The cable 130 may include a cable body 131 and a cable terminal 132.

The cable body 131 may extend in one direction. The cable body 131 may include a deformable material. The cable body 131 may have flexibility.

The cable 130 may have a shape corresponding to the seating portion 1213. The cable 130 may have different widths. For example, the cable 130 may include a first portion 135 corresponding to the first area 1211 of the seating portion 1213, and a second portion 136 corresponding to the second area 1211 of the seating portion 1213. A width W3 of the first portion 135 may be greater than a width W4 of the second portion 136, and a catching portion 133 may be formed according to a difference between the width W3 of the first portion 135 and the width W4 of the second portion 136. The cable 130 may have substantially a T shape. The catching portion 133 of the cable 130 may be caught by the projection 1218 of the case 1210. Accordingly, in a state in which the cable 130 is seated on the seating portion 1213, the cable 130 may be prevented from departing from the seating portion 1213 in the horizontal direction H. That is, the cable 130 may be more stably coupled with the connector 120.

The cable terminal 132 may be provided at both ends of the cable body 131. The cable terminal 132 may be in contact with the connector terminal 1214. The cable terminal 132 may be configured with a plurality of conducting wires 132a. The plurality of conducting wires 132a may extend in a direction that is in parallel to an extension direction of the cable body 131. The plurality of conducting wires 132a may be arranged in such a way as to be spaced from each other in a width direction of the cable body 131. The plurality of conducting wires 132a may be formed of a conductive material to transmit electrical signals or current. The plurality of conducting wires 132a may be selected from among silver, copper, nickel, cobalt, or a combination thereof, although these are examples. However, the plurality of conducting wires 132a may be formed of any conductive material.

For example, the cable 130 may include at least one of a Flexible Flat Cable (FFC) or a Flexible Printed Circuit Board (FPCB). In the drawings, a case in which the cable 130 is a FFC is shown as an example.

FIG. 7 shows a process of seating a cable on the connector shown in FIG. 4. FIG. 8 shows a closing process of the connector shown in FIG. 4.

A process of seating the cable 130 on the connector 120, and a process of closing the connector 120 will be described with reference to FIGS. 7 and 8.

In a state in which the connector 120 opens, that is, in a state in which the cover 1220 opens the seating portion 1213 of the case 1210, the cable 130 may be seated on the seating portion 1213. At this time, the cable 130 may be seated on the seating portion 1213 in the vertical direction V such that a flat surface 131a of the cable 131 faces the seating portion 1213. Upon seating of the cable 130 on the seating portion 1213, the cable terminal 132 may be in contact with the connector terminal 1214. Upon seating of the cable 130 on the seating portion 1213, the catching portion 133 of the cable 130 may be caught by the projection 1218 of the case 1210. Accordingly, a movement in horizontal direction H of the cable 130 may be prevented. Also, because the shape of the cable 130 corresponds to the shape of the seating portion 1213, a movement in width direction W of the cable 130, as well as a movement in horizontal direction H of the cable 130, may also be prevented. That is, the cable 130 may be prevented from being easily separated from the connector 120. Meanwhile, upon seating of the cable 130 on the seating portion 1213, the cable 130 may press the switch 410 (that is, the first switch 411). Upon downward-pressing of the switch 410, the interworking portion 430 interworking with the switch 410 may move upward, although not limited thereto. However, a user may himself/herself press the switch 410 (that is, the second switch 412). The interworking portion 430 may move upward to release coupling between the case 1210 and the cover 1220. More specifically, as shown in (b) of FIG. 8, the interworking portion 430 may release coupling between the first elastic protrusion 220 and the first hole 210 by pushing the first elastic protrusion 220 out of the first hole 210. Upon releasing of the coupling between the first elastic protrusion 220 and the first hole 210, the cover 220 may rotate in the first direction C by an elastic force provided by the elastic member 1240, and the seating portion 1213 may be closed by the cover 1220.

Generally, a cable such as a FFC, having flexibility, may be coupled with a connector by being inserted into the connector in the horizontal direction. In the case of such a horizontal coupling method, a certain space for coupling a cable in a horizontal direction needs to be secured. Also, in a case in which a connector is positioned at the innermost part of a product, there may be difficulties in inserting a cable into the connector, and an additional task for checking whether the cable has been properly coupled with the connector may be needed. Meanwhile, due to the flexibility of the cable, the cable may be bent or damaged in a process of inserting the cable into the connector in the horizontal direction.

In contrast, according to the disclosure, the cable 130 may be coupled with the connector 120 in the vertical direction V. More specifically, the cable 130 may be seated on the seating portion 1213 in the vertical direction V such that the one surface 131a of the cable body 131 faces the seating portion 1213. That is, the cable 130 may be electrically connected to the connector 120 by a vertical coupling method. Accordingly, the cable 130 may be coupled with the connector 120 without any space constraint. Also, because the cable 130 is seated on the seating portion 1213 in the vertical direction V, the cable terminal 132 may be more stably in contact with the connector terminal 1214. Also, a risk that the cable will be bent or damaged may be reduced.

Figure 10:
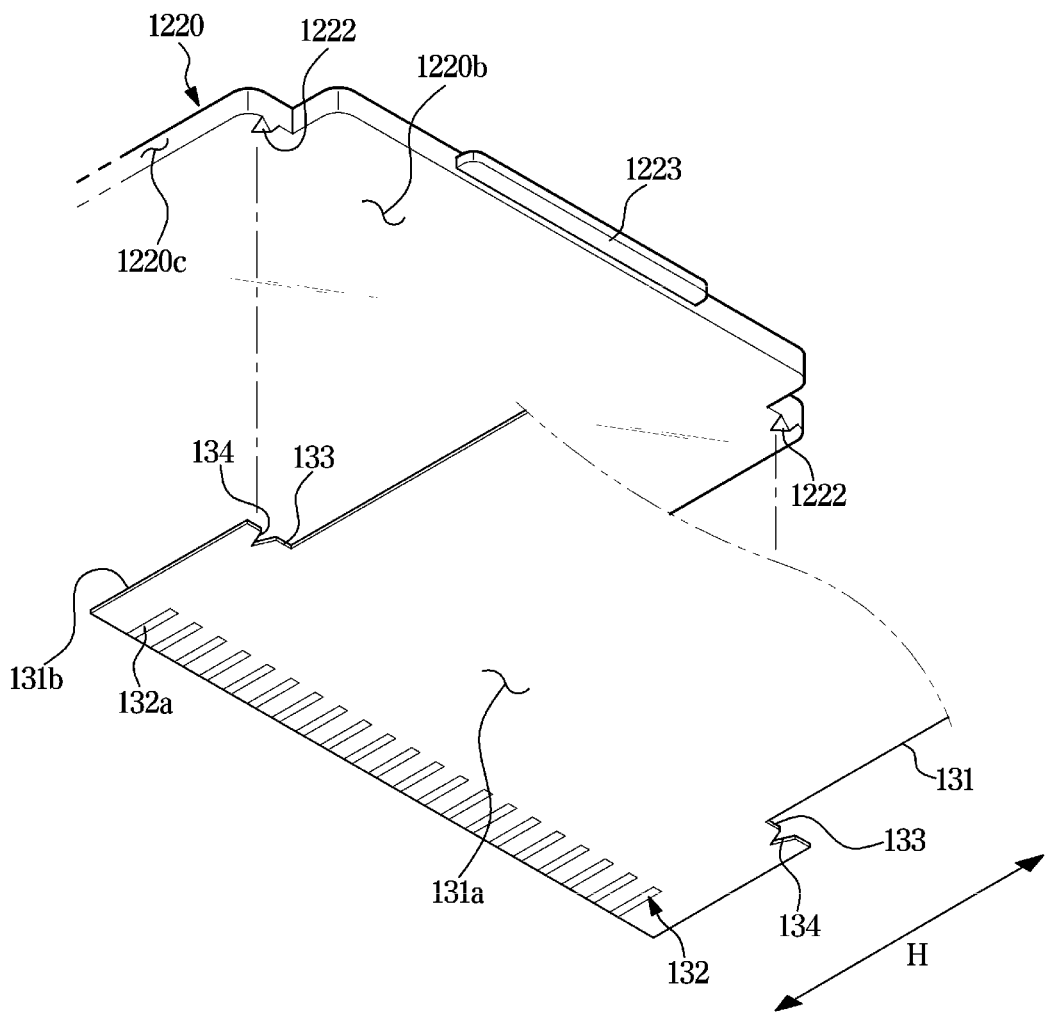
FIG. 10 schematically shows a coupling relation between a cover of the connector shown in FIG. 4 and a cable.

FIG. 10 schematically shows a coupling relation between a cover of the connector and a cable.

Referring to FIG. 10, the cover 1220 may include a separating prevention portion 1222 for preventing the cable 130 from departing from the seating portion 1213 in a state in which the cable 130 is seated on the seating portion 1213 of the case 1210 and then the cover 1220 closes the seating portion 1213. The separating prevention portion 1222 may protrude from the lower side 1220b of the cover 1220 toward the seating portion 1213. Also, the cable 130 may include a cutting groove 134 corresponding to the separating prevention portion 1222. That is, the separating prevention portion 1222 may be coupled with the cutting groove 134 in a state in which the cover 1220 closes the seating portion 1213. Accordingly, the cable 120 may be prevented from being coupled with the connection 120 in a state of departing from the seating portion 1213 or being twisted or bent inside the seating portion 1213. Also, by limiting a movement of the cable 130, a contact force between the connector terminal 1214 and the cable terminal 132 may be improved. As a result, an electrical connection between the connector 120 and the cable 130 may be more stably conducted.

According to an aspect of the disclosure, the connector and the display apparatus including the connector may improve a cable connection method.

According to another aspect of the disclosure, the connector and the display apparatus including the connector may prevent a cable from departing from the connector.

According to still another aspect of the disclosure, the connector and the display apparatus including the connector may improve ease of use and productivity by performing an automatic closing function.

So far, specific embodiments have been shown and described. However, the disclosure is not limited to the above-described embodiments, and various modifications can be made by those skilled in the art without departing from the gist of the technical idea of the disclosure defined by the claims below.

What is claimed is:

1. A display apparatus comprising:
   a display panel;
   a chassis assembly to support the display panel; and
   a printed circuit board assembly accommodated in the chassis assembly, the printed circuit board assembly including
      a printed circuit board configured to drive and control the display panel; and
      a connector installable on the printed circuit board and configured to electrically connect the display panel to the printed circuit board via a cable, and the connector including:
         a seating portion,
         a connector terminal positioned at one side of the seating portion,
         a cover that is rotatable to open and close the seating portion, the cover configured to be lockable in a position to open the seating portion, and
         a switch configured to, while the cover is locked in the position to open the seating portion, release the cover to rotate in a direction to close the seating portion,
   wherein the connector is connected to the cable while a surface of the cable faces the seating portion along a vertical direction of the connector and contact-coupling a cable terminal formed at one end of the cable with the connector terminal.

2. The display apparatus of claim 1, wherein the connector comprises:
   a case including a recess forming the seating portion, wherein an upper side of the recess opens so that the cable is seated on the seating portion along the vertical direction of the connector, and the cover is coupled to the case;
   an elastic member providing a preset elastic force to the cover to rotate the cover along the direction to close the seating portion;
   a locking device, provided in at least one of the cover or the case, to couple the cover with the case in the position to open the seating portion; and an unlocking device to release the coupling of the cover with the case by the locking device.

3. The display apparatus of claim 2, wherein the unlocking device comprises:
an interworking portion formed to extend from the switch, and configured to press the cover by moving upward upon a downward-pressing of the switch.

4. The display apparatus of claim 2, wherein the locking device comprises:
a first hole provided in the case; and
a first elastic protrusion provided in the cover and couplable with the first hole.

5. The display apparatus of claim 4, wherein the unlocking device is configured to pushes the first elastic protrusion out of the first hole in a state in which the first elastic protrusion is coupled with the first hole.

6. The display apparatus of claim 2, wherein the locking device is a first locking device,
the connector further comprises a second locking device, provided in at least one of the cover or the case, to couple the cover with the case in a state in which the cover closes the seating portion, and
the second locking device comprises:
a second hole provided in the case; and
a second elastic protrusion provided in the cover and coupled with the second hole.

7. The display apparatus of claim 2, wherein
the cover comprises a separating prevention portion formed to protrude toward the seating portion and couplable with the cable, to prevent the cable from departing from the seating portion, in a state in which the cable is seated on the seating portion and the cover closes the seating portion, and
the cable comprises a cutting groove corresponding to the separating prevention portion.

8. The display apparatus of claim 2, wherein the one side of the seating portion, on which the connector terminal is positioned, is a first side,
the case further comprises a projection formed to protrude inward along a width direction of the connector such that a second side of the seating portion, which is opposite to the first side of the seating portion, has a smaller width than the first side, and
a catching portion of the cable is adapted to be caught by the projection to prevent the cable seated on the seating portion from departing from the seating portion along a horizontal direction of the connector.

9. The display apparatus of claim 3, wherein the unlocking device further comprises
an auxiliary guide member guiding a movement of the interworking portion so that the interworking portion is movable along an up-down direction by interworking with the switch.

10. The display apparatus of claim 2, wherein the elastic member comprises at least one torsion spring.

11. The display apparatus of claim 1, wherein the cable comprises at least one of a Flexible Flat Cable (FFC) or a Flexible Printed Circuit Board (FPCB).

12. The display apparatus of claim 1, wherein the connector further comprises a handle that is gripped.

13. The display apparatus of claim 3, wherein the switch is positioned inside the seating portion and configured to be pressed downward upon seating of the cable on the seating portion along the vertical direction of the connector.

14. The display apparatus of claim 3, wherein the switch is positioned outside the seating portion without interfering with the cable.

15. The display apparatus of claim 1, wherein one end of the cable is electrically connected to the printed circuit board, and another end of the cable is electrically connected to the display panel.

16. A display apparatus comprising:
a display panel;
a chassis assembly to support the display panel; and
a printed circuit board assembly accommodated in the chassis assembly, the printed circuit board assembly including:
a printed circuit board configured to drive and control the display panel; and
a connector installable on the printed circuit board and configured to electrically connect the display panel to the printed circuit board via a cable, and the connector including:
a seating portion,
a connector terminal positioned at one side of the seating portion,
a case including a recess forming the seating portion, wherein an upper side of the recess opens so that the cable is seated on the seating portion along the vertical direction of the connector,
a cover rotatably couplable with the case to open or close the seating portion,
an elastic member providing a preset elastic force to the cover to rotate the cover along a direction of closing the seating portion,
a locking device, provided in at least one of the cover or the case, coupling the cover with the case in a state in which the cover opens the seating portion, and
an unlocking device releasing the coupling of the cover with the case by the locking device,
wherein the connector is connected to the cable while a surface of the cable faces the seating portion along a vertical direction of the connector and contact-coupling a cable terminal formed at one end of the cable with the connector terminal, and
an upper side of the recess opens so that the cable is seated on the seating portion along the vertical direction of the connector.

* * * * *

UNITED STATES PATENT AND TRADEMARK OFFICE
CERTIFICATE OF CORRECTION

PATENT NO. : 12,170,418 B2
APPLICATION NO. : 17/737335
DATED : December 17, 2024
INVENTOR(S) : Jinsub Kim et al.

Page 1 of 1

It is certified that error appears in the above-identified patent and that said Letters Patent is hereby corrected as shown below:

In the Claims

Column 15, Line 15:
In Claim 5, delete "pushes" and insert -- push --.

Signed and Sealed this
Twenty-fifth Day of February, 2025

Coke Morgan Stewart
*Acting Director of the United States Patent and Trademark Office*